UNITED STATES PATENT OFFICE.

RUFUS N. CHAMBERLAIN, OF CHICAGO, ILLINOIS, ASSIGNOR TO GOULD STORAGE BATTERY COMPANY, A CORPORATION OF NEW YORK.

STORAGE-BATTERY PLATE AND PROCESS OF TREATING SAME.

1,304,852.      Specification of Letters Patent.      Patented May 27, 1919.

No Drawing.     Application filed May 13, 1916.    Serial No. 97,325.

*To all whom it may concern:*

Be it known that I, RUFUS N. CHAMBERLAIN, a citizen of the United States, and a resident of the city of Chicago, county of Cook, State of Illinois, have invented certain new and useful Improvements in Storage-Battery Plates and Processes of Treating Same, of which the following is a specification.

My invention relates to storage battery plates and particularly to a process for treating active material of negative plates so that the plates may be stored away after manufacture without being substantially chemically affected by exposure to atmosphere. This treatment will also make them receive the charge more efficiently and therefore develop their capacity more quickly when they are assembled and put in electrolyte for that purpose.

It is well known that if negative storage battery plates, as heretofore treated, are exposed to the atmosphere for any substantial length of time after they are formed it will take from 50 to 70 hours to properly bring them to charged condition without injury. This is probably due to the fact that after the old process of immersing the formed negative plates in a solution of sulfuric acid the spongy lead chemically combines with some element of the atmosphere to form oxid of lead, and probably other compounds. The long period of time heretofore necessary to reduce the oxid of lead and other compounds back to spongy lead is avoided by so treating the negatives that the lead oxid and other compounds are not formed.

Whatever the chemical or other action is that takes place, it is well known that after negative storage battery plates, as heretofore treated, have been exposed to atmosphere for any substantial period, it takes a great deal of power and time to initially charge them, but after the use of my process the time necessary to bring the plates to a complete charge is much reduced, and instead of 50 to 70 hours, as heretofore necessary, they can be charged in from 15 to 30 hours.

The process which I have found in use to be satisfactory is as follows: When the plates have been substantially formed in the regular process of manufacture and are otherwise ready to be put into stock, they are immersed in a substantially saturated solution of sulfate of zinc from four to six hours, more or less. They are then taken out and allowed to drip off and are then ready to be put in stock. It is understood that the strength of the sulfate of zinc solution may be less than that above indicated and also that the time of immersion can be increased or decreased without materially changing the results. It is found that if the zinc solution is strong the plates may be immersed for a comparatively short time, while if the strength of the solution is less, the time of immersion should be substantially correspondingly increased. Also, while I have given the specific substance with which the plates are treated as sulfate of zinc, I do not wish to be limited to the use of that substance as any equivalent substance may be used, particularly, any substance which will permit of the application of a certain amount of zinc to the active material of the plates. Also, other substances of the zinc family, or having the same potential as zinc, may be used satisfactorily, such as aluminum, cadmium or bismuth. While I have also indicated above that the plates are immersed in a solution, my invention is evidently not limited to this mode of application of the substance, but the same may be applied in any suitable manner, such as by spraying or otherwise. The negatives could be put into a sulfuric acid solution containing about 1% zinc and by passing a current from a dummy to the negatives as cathodes a very slight deposit of zinc would occur at the negatives, which would produce much the same effect as dipping the finished negatives in a solution of sulfate of zinc.

After the negative plates have been immersed in a saturated solution of sulfate of zinc, they dry with a darker shade than those which have not been given the treatment. Without the treatment, the negatives whiten considerably and show signs of lead sulfate if not washed in water, and if washed in water, they show signs of carbonating when drying after being washed.

Due to the fact that cadmium has properties similar to those of sulfate of zinc, it will have the same or similar action on the negatives as will the sulfate of zinc. The same is true of bismuth.

The above remarks apply equally whether the electrode is immersed in a tank or whether the solution is sprayed or otherwise applied to it.

By the use of electrolysis, a very weak solution of sulfate of zinc or similar material can be used to produce approximately the same results as immersion. This is merely another means of applying a sufficient amount of the sulfate of zinc or similar material to the electrode and is entirely equivalent to that of immersion in a saturated solution.

I do not know the chemical action or actions involved in the use of my process, nor do I know exactly the chemical reason why negative plates treated under the old process should require so much time and power to charge them, but I do know that the application of sulfate of zinc to the plates so affects them that the atmospheric elements have little, or no, detrimental effect upon them. Consequently, the plates, after my treatment, may be put in stock and the active material is in a condition readily receptive to charge when the plates are assembled and put in electrolyte in a cell to be charged for regular service.

I intend that the claims appended hereto shall cover the broad process of rendering the active material of the plates substantially chemically unaffected by exposure to atmosphere and putting them in condition to be readily receptive to charge when placed in electrolyte for that purpose.

Having described my invention, what I claim as new and desire to secure by Letters Patent is:

1. The process of treating storage battery negative plates which consists in subjecting them to the action of sulfate of zinc or a substance having properties similar thereto whereby they are rendered substantially chemically unaffected by exposure to the atmosphere, and when assembled will be in condition to be quickly and easily charged in from fifteen to thirty hours without injury.

2. The process of treating storage battery negative plates which consists in immersing them in a sulfate of zinc solution.

3. The process of treating storage battery negative plates which consists in subjecting the active material thereof to sulfate of zinc.

4. The process of treating formed storage battery negative plates which consists in immersing said plates in a substantially saturated solution of sulfate of zinc.

5. The process of treating formed storage battery negative plates which consists in immersing them from 4 to 6 hours in a sulfate of zinc solution.

6. The process of treating formed storage battery negative plates which consists in immersing them from 4 to 6 hours in a substantially saturated solution of sulfate of zinc.

7. The process of treating storage battery negative plates which consists in treating them with a substance having substantially the same potential to lead as that of zinc to lead and which substance also holds in combination a considerable amount of water.

8. A storage battery negative plate comprising a grid and active material thereon which after formation has been subjected to the action of a solution of sulfate of zinc.

9. A storage battery negative plate comprising a grid and active material thereon which has a deposit of sulfate of zinc or a substance having properties similar to those of sulfate of zinc thereon to render said plates substantially chemically unaffected by exposure to atmosphere.

10. A formed storage battery negative plate which, after formation, has been subjected to sulfate of zinc or like substance whereby after having been exposed to atmosphere for a substantial period of time it may be properly charged in from fifteen to thirty hours without injury.

In testimony whereof, I have signed my name to this specification.

RUFUS N. CHAMBERLAIN.